(12) United States Patent
Lesniak

(10) Patent No.: US 6,822,220 B2
(45) Date of Patent: Nov. 23, 2004

(54) OPTICAL PATTERN FOR AN OPTICAL ENCODER

(75) Inventor: Christopher M. Lesniak, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 10/176,849

(22) Filed: Jun. 20, 2002

(65) Prior Publication Data

US 2003/0234350 A1 Dec. 25, 2003

(51) Int. Cl.[7] .................................................. H01J 3/14
(52) U.S. Cl. ........................... 250/231.13; 250/231.24; 250/237 G; 341/13

(58) Field of Search ....................... 250/231.13, 231.14, 250/231.16, 231.17, 231.18, 237 G, 237 R; 341/13, 31; 356/614–618, 225, 228; 33/706, 707

(56) References Cited

U.S. PATENT DOCUMENTS 4,786,891 A * 11/1988 Ueda et al. .................... 341/13
4,906,838 A * 3/1990 Sogabe et al. .......... 250/231.14
5,856,668 A * 1/1999 Nelle et al. ............. 250/231.13

* cited by examiner

*Primary Examiner*—Kevin Pyo

(57) ABSTRACT

An optical encoder includes a planar surface comprising an insulator material. An optical encoder pattern partially occupies the planar surface. The encoder pattern has at least one continuous geometry and is made from a conductive material.

26 Claims, 5 Drawing Sheets

CONTINUOUS GEOMETRY OPAQUE COATING 720

CONTACT PATH 810

OPTICAL PATTERN FOR AN OPTICAL ENCODER

BACKGROUND

Optical encoding is often used in mechanical systems as an inexpensive and reliable way to measure and track motion among moving components. For instance, printers, scanners, photocopiers, fax machines, plotters, and other imaging systems commonly use optical encoding to track the position of an image media, such as paper, as an image is printed on the media or an image is scanned from the media.

One common technique for optical encoding uses an optical sensor and an optical encoder. The optical sensor focuses on a surface of the optical encoder. As the sensor moves with respect the encoder, or the encoder moves with respect to the sensor, the sensor reads a pattern on the encoder to detect the motion.

A typical encoder pattern is an alternating series of features. As the encoder and sensor move relative to the one another, transitions from one feature to the next in the pattern are optically detected. For instance, an encoder pattern could be an alternating pattern of holes, or optically transmissive windows, in an opaque material. In which case, an optical sensor can detect transitions from darkness to light passing through the holes or windows.

Optical encoders, like many other mechanical components, are often made of insulating materials, such as plastics. Friction between a plastic encoder and another material, such as a plastic sensor housing or guide, generates an electric surface charge on the encoder. This charge is called a triboelectric charge. The electric charge tends to attract airborne particles, such as paper dust and ink aerosol in an ink jet printer. Over time, the particulate matter can accumulate on the encoder and interference with the accuracy of the optical encoding process by obscuring transitions between features in the encoding pattern.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

In various embodiments, the present invention distributes and/or discharges electric charge from an optical encoder. Embodiments of the present invention can substantially reduce the accumulation of particulate matter on an optical encoder over time that could otherwise occur without a substantial additional cost. In general, embodiments of the present invention use an encoder pattern having a continuous geometry of conductive material to allow electric charge to migrate from areas of high voltage potential to areas of low voltage potential.

Figure 1:
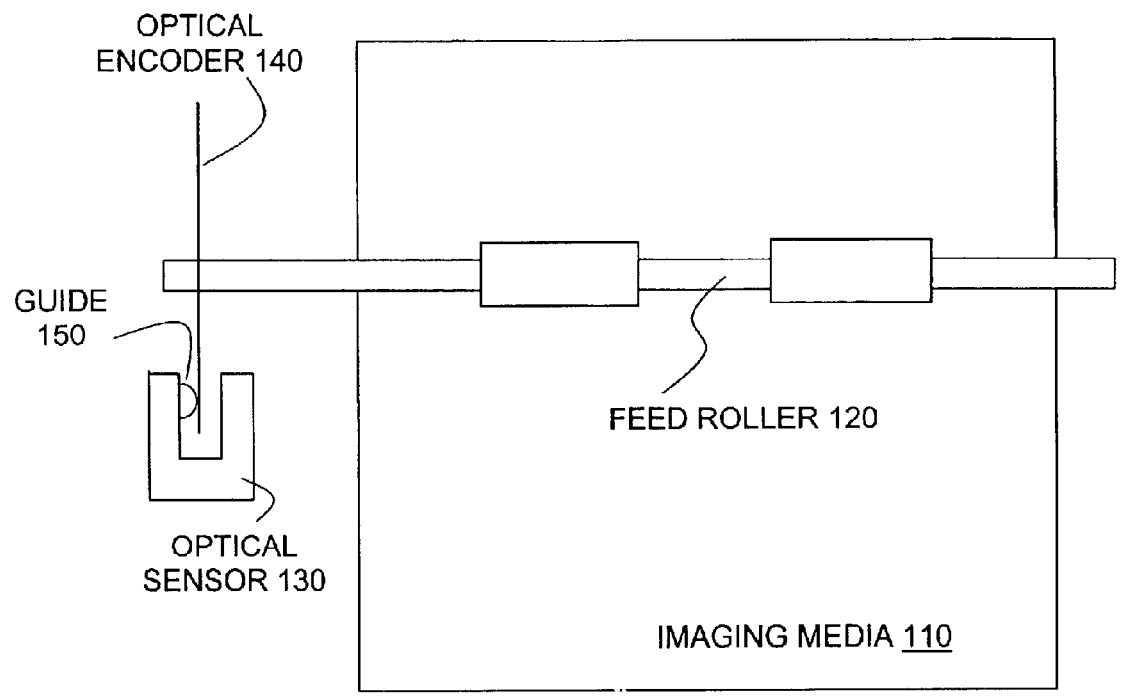
FIG. 1 illustrates an exemplary mechanical system in which one embodiment of the present invention can be used.

FIG. 1 illustrates an example of a mechanical system in which an embodiment of the present invention can be used. Feed roller 120 is in contact with imagining media 110 so as to rotate when imagining media 110 moves perpendicularly relative to feed roller 120. Optical encoder 140 is attached to an end of feed roller 120 and rotates in unison with feed roller 120. Optical sensor 130 is situated relative to optical encoder 140 to detect rotational motion of encoder 140.

Guide 150 is an example of a source of electric charge. In the illustrated embodiment, encoder 140 comprises a thin and flexible film. Guide 150 presses on encoder 140 to maintain a predetermined spacing between encoder 140 and sensor 130. If both encoder 140 and guide 150 are insulators, guide 150 will generate triboelectric charge along a friction path on a surface of encoder 140 as encoder 140 rotates. In alternate embodiments, electric charge may accumulate on encoder 140 from any number of additional sources.

Figure 2:
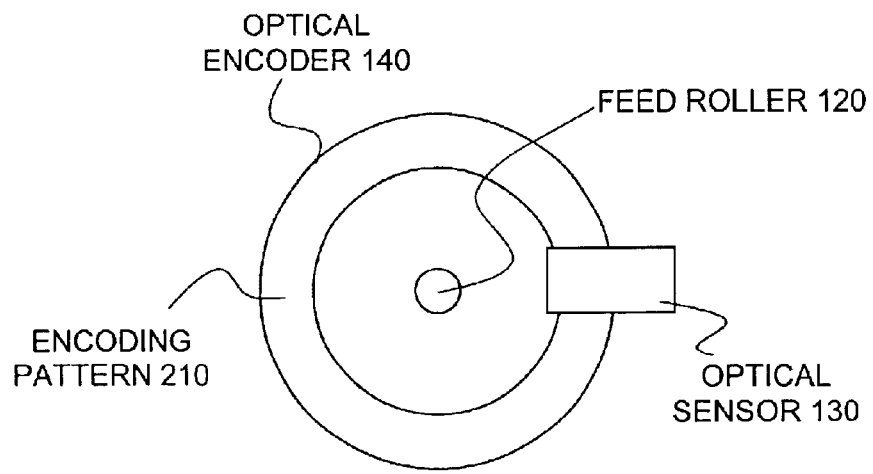
FIG. 2 illustrates another perspective of the mechanical system of FIG. 1.

FIG. 2 illustrates the mechanical system of FIG. 1 as seen from an end of feed roller 120. Encoder 140 comprises a wheel shape and includes an encoding pattern 210 along the edge of the wheel. Sensor 130 straddles encoder 140 over encoding pattern 210. Assuming the path of friction from guide 150 is over encoding pattern 210, the triboelectric charge will preferentially attract particulate matter to pattern 210 unless the charge is discharged or distributed.

Figure 3:
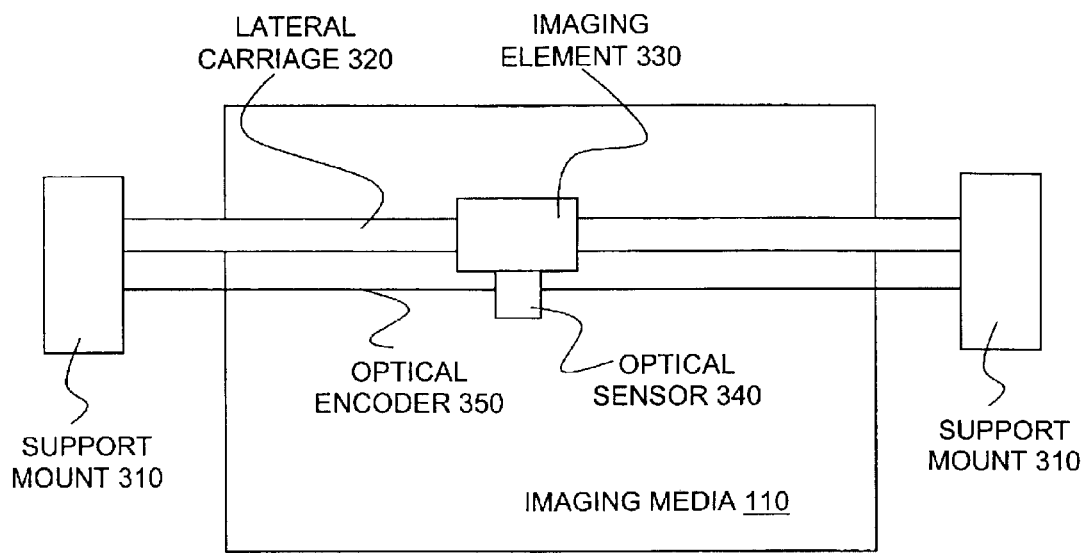
FIG. 3 illustrates another exemplary mechanical system in which one embodiment of the present invention can be used.

FIG. 3 illustrates another simplified example of a mechanical system in which one embodiment of the present invention can be used. Instead of a rotating encoder wheel, as illustrated in FIGS. 1 and 2, the embodiment of FIG. 3 uses a fixed optical encoder 350 in the shape of a strip or tape. Like encoder 140 discussed above, encoder 350 is a thin and flexible film seen in FIG. 3 from an edge.

Encoder 350 and lateral carriage axis 320 are both mounted between two support mounts 310. Imaging element 330 is coupled to lateral carriage axis 320 so as to move from side to side over imaging media 110. Imaging element 330 may be, for instance, a print head, scan head, or the like. Optical sensor 340 is coupled to imaging element 330 so as to straddle encoder 350. As imaging element 330 moves along lateral carriage axis 320, optical sensor 340 detects the motion relative to encoder 350.

Figure 4:
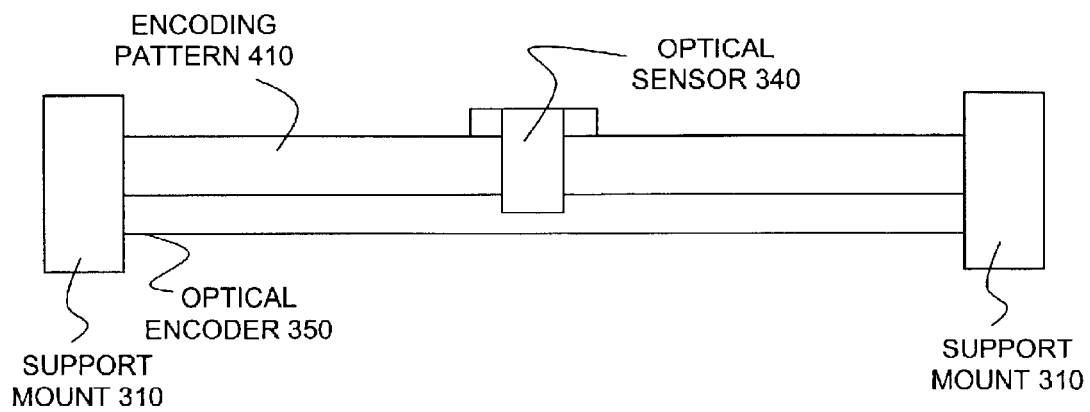
FIG. 4 illustrates another perspective of the mechanical system of FIG. 3.

FIG. 4 illustrates the mechanical system of FIG. 3 as seen from a perspective showing the surface of optical encoder 350. Encoder 350 includes encoding pattern 410. Sensor 340 straddles encoder 350 over encoding pattern 410. Any rubbing between encoder 350 and sensor 340 could generate electrical charge along the path of the friction and attract particulate matter to encoding pattern 410 unless it is discharged or distributed.

The mechanical systems depicted in FIGS. 1 through 4 are greatly simplified for purposes of highlighting the embodiments of the present invention. Several components are not shown, including a support structure for feed roller 120 and sensor 130, gears and a motor assembly to drive feed roller 120 to move imagining media 110, gears and a motor assembly to drive lateral carriage axis 320 to move imaging element 330, as well as control systems to operate the motor assemblies based on output from sensors 130 and 340.

The mechanical system of FIG. 3 could be used in conjunction with the mechanical system of FIG. 1. For instance, if the mechanical systems were in a printer, feed roller 120 could advance media 110 in increments measured by sensor 130. Meanwhile, imaging element 330 could move across media 110 in increments measured by sensor 340 to print an image with one horizontal pass for each incremental movement of feed roller 120.

Figure 5:
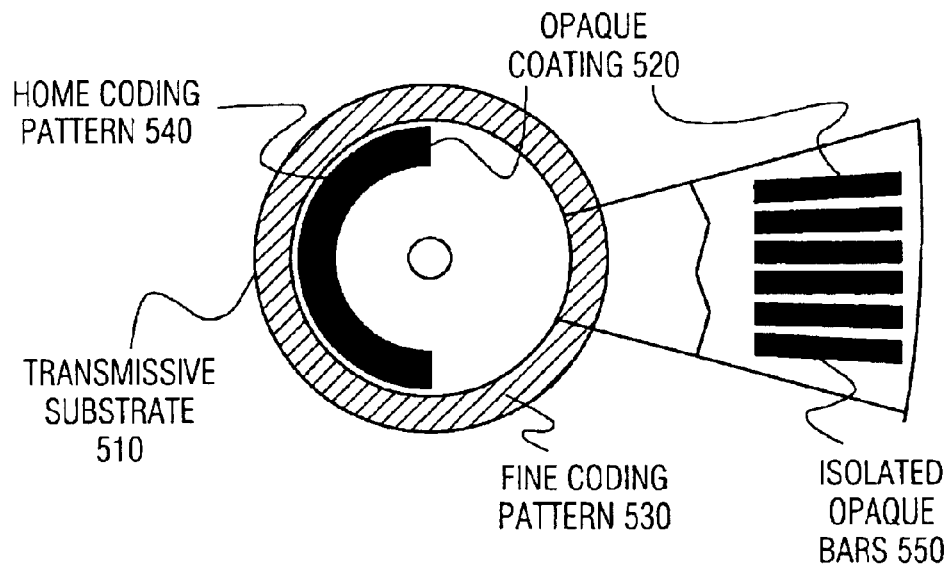
FIG. 5 illustrates one embodiment of an encoder wheel.

FIG. 5 illustrates one embodiment of an optical encoder wheel that could accumulate sufficient particulate matter to interfere with its proper operation. The encoder wheel comprises an optically transmissive substrate 510. Substrate 510 has an opaque coating 520 which has been applied to form a home coding pattern 540 and a fine coding pattern 530. Any number of approaches can be used to form opaque coating 520 into the illustrated patterns, including photolithographic processing, mechanical etching, laser etching, and the like. In alternate embodiments, the opaque coating 520 is painted onto substrate 510 or deposited within substrate 510 in the illustrated patterns.

Home coding pattern 540 has just one transition from optically transmissive to opaque, or one transition from opaque to optically transmissive, per revolution. In which case, home coding pattern 540 can be used to detect and control large-scale rotational motion, such as counting revolutions or finding a home reference point. Fine coding pattern 530 comprises numerous isolated opaque bars 550, as shown in an enlarged view. The isolated opaque bars 550 are tightly packed to provide transitions at very small increments. Fine coding pattern 530 can be used to detect and control minute rotational motion.

Transmissive substrate 510 is commonly made from an insulating material, such as Mylar or some other form of plastic. Triboelectric charge builds-up on the surface of substrate 510 as it rubs against other materials, such as a housing for an optical sensor or a guide. Since the surface is an insulator, the charge has no where to go. In other words, electric charge on an insulator is rather like a drop of water on a glass table top. Left isolated, the charge attracts and collects particulate matter until it eventually dissipates into the atmosphere, leaving the particles behind. Over time, the particles can obscure pattern transitions and cause errors in optical encoding, especially in fine coding pattern 530.

Figure 6:
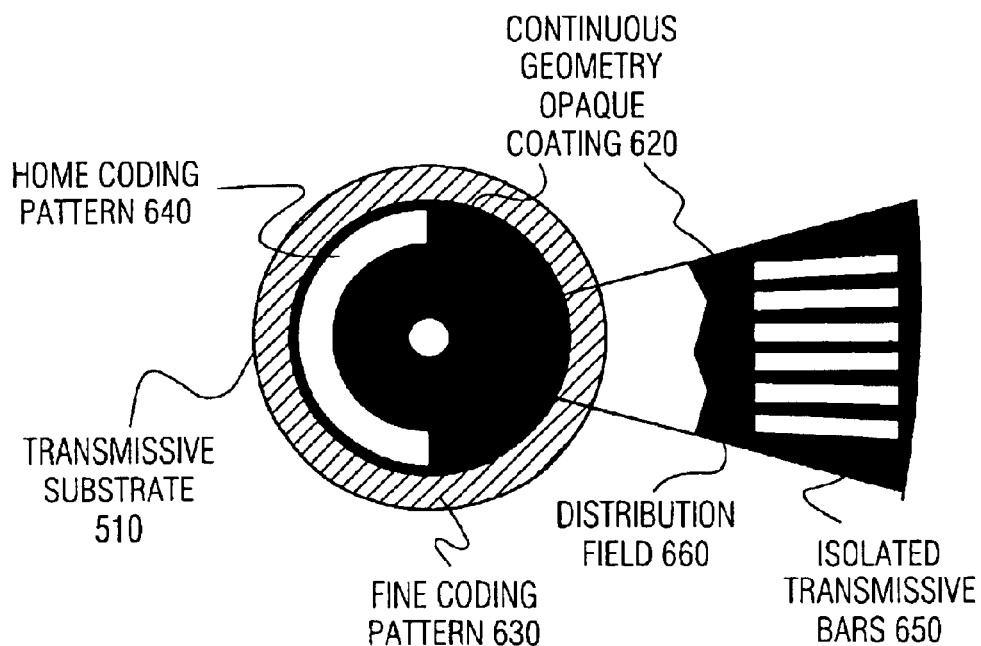
FIG. 6 illustrates an encoder wheel incorporating one embodiment of the present invention.

FIG. 6 illustrates one embodiment of the present invention for an encoding wheel. The number of pattern transitions per revolution in home coding patterns 640 and 540, and in fine coding patterns 630 and 530, are identical. However, rather than applying the opaque coating in such a manner as to leave isolated opaque bars, as shown in the encoder of FIG. 5, opaque coating 620 is applied in such a way as to leave optically transmissive windows through substrate 510, such as isolated bars 650. That is, opaque coating 620 retains a continuous geometry, with no isolated sections among home coding pattern 640 or fine coding pattern 630.

Furthermore, opaque coating 620 includes a conductive material, such as silver or carbon. Accumulated surface charge, that had no where to go in FIG. 5, is conducted away in FIG. 6 and distributed throughout the continuous geometry of opaque coating 620. That is, the "drops" of electric charge that are deposited within the continuous geometry of coating 620 are rather like drops falling onto the surface of a pool of water. The amount of charge is evenly distributed over the entire coating 620, allowing it to dissipate over a larger surface area. In the illustrated embodiment, large sections of opaque coating 620 are left in place to form distribution field 660, surrounding coding patterns 640 and 630, to conduct and dissipate accumulated charge. In other words, opaque coating 620 acts like a ground plane.

Of course, electric charge is also deposited on the islands of insulated substrate 510. However, electric charge is naturally attracted to areas of lower voltage potential. Rather like drops of rain falling on an island and draining into the surrounding sea, electric charge deposited on the islands of insulated substrate 510 may migrate into the ground plane of coating 620.

If coating 520 in FIG. 5 were made of the same conductive material as coating 620, the same migration of charge from insulator to conductor could occur. However, in FIG. 5, coating 520 does not have a continuous geometry. Rather than islands of insulators in a sea of conductor, FIG. 5 would be oases of conductor in a dessert of insulator. Charge deposited on the insulator could migrate to the conductors and likely accumulate to a high enough level to attract and accumulate particulate matter. With a sea of conductor, however, as in FIG. 6, the charge is much more widely spread, keeping the charge level, or "water" level, so to speak, at any one place to a much lower level, dissipating the charge over a larger area and reducing the likelihood of attracting and accumulating particulate matter. The illustrated embodiment accomplishes this reduction with little or no additional cost compared to the embodiment of FIG. 5, and without introducing any new parts to a mechanical system.

Figure 7:
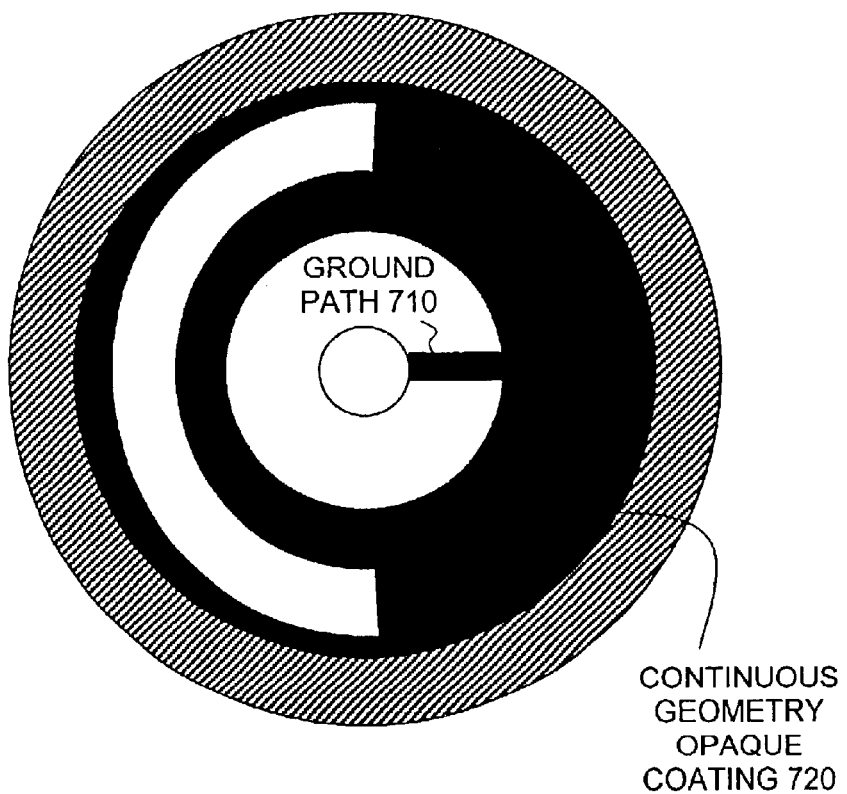
FIG. 7 illustrates one embodiment of the present invention having a ground path to a center mount of an encoder wheel.

In some mechanical systems, the combination of a conductive surface and a continuous geometry may not be sufficient to dissipate enough charge to sufficiently reduce particulate accumulation. FIG. 7 illustrates another embodiment of the present invention, however, having ground path 710 leading to a mounting hole at the center of the encoder wheel. In which case, by mounting the encoder wheel to a conductive material, charge build-up on the encoder wheel can be discharged to the conductive material. For instance, referring back to FIG. 1, where encoder 140 couples to feed roller 120, feed roller 120 can be made out of a metal or a plastic impregnated with a conductor, such as carbon. In turn, the conductive part of roller 120 can be grounded to other components (not shown) in the mechanical system.

Figure 8:
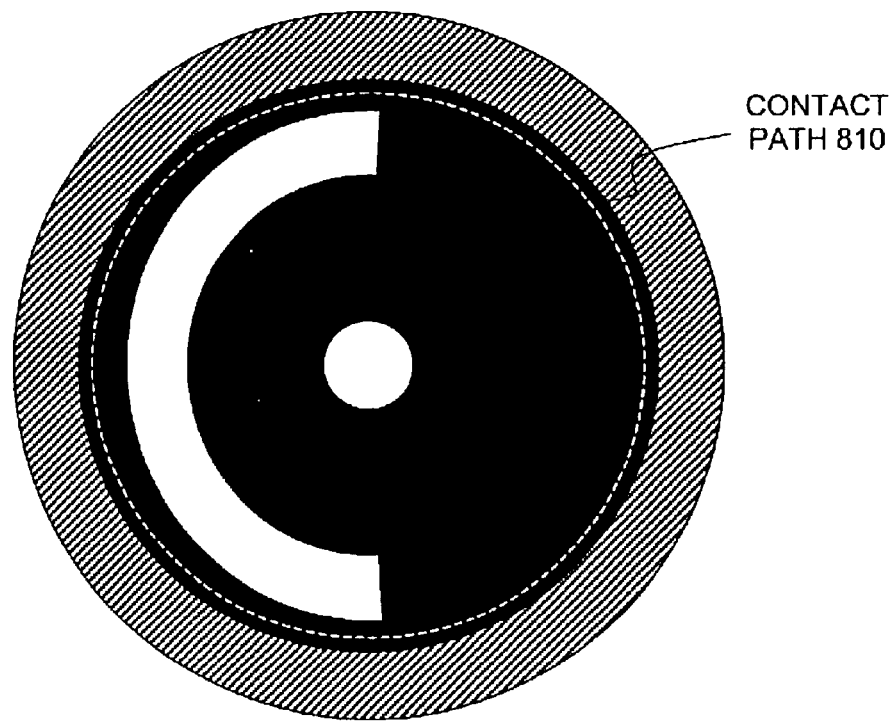
FIG. 8 illustrates one embodiment of the present invention having a ground path to a contact path on an encoder wheel.

FIG. 8 illustrates another embodiment of the present invention for discharging an encoder. In FIG. 8, contact path 810 is illustrated as a white dashed circular path within the conductive distribution field of an encoder. For instance, referring back to FIG. 1, guide 150 may rub on the encoder wheel along contact path 810. In which case, by using a conductive material for guide 150, charge build-up on the encoder wheel could be discharged to the conductive material. In other words, rather than guide 150 being a source of triboelectric charge, guide 150 could be used to discharge the encoder.

In the embodiments of FIGS. 7 and 8, no additional parts are needed to discharge the encoder wheels, and any number of conductor geometries could be used to connect to ground paths. Furthermore, the levels of charge involved are likely to be very low in most situations, so strong ground connections are not usually needed. In which case, the small amount of conductivity needed in the grounding components that couple to an encoder wheel is unlikely to add significant cost or complexity in most mechanical systems. Any number of axle or gear assemblies, contact guides, mounting pads, or the like, could be made of metal or impregnated with a conductor.

Figure 9:
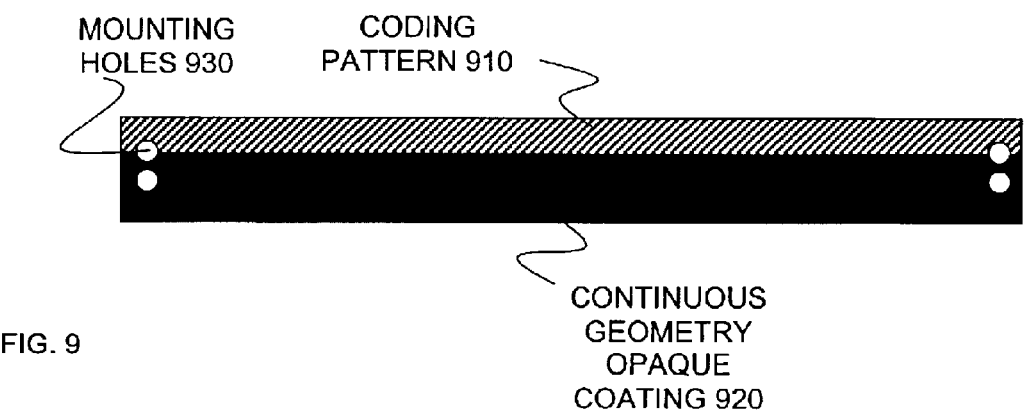
FIG. 9 illustrates an encoder strip incorporating one embodiment of the present invention having a ground path.
Figure 10:
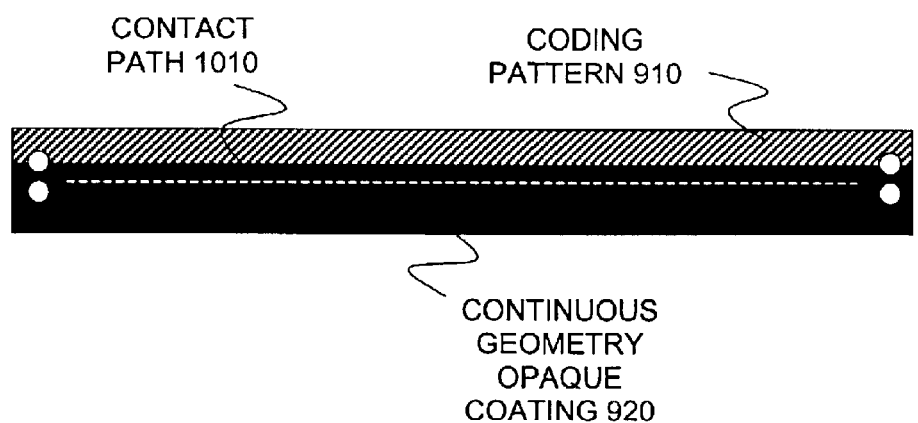
FIG. 10 illustrates one embodiment of the present invention having a ground path to a contact path on an encoder strip.

FIGS. 9 and 10 illustrate two embodiments of the present invention for encoder strips. Both embodiments use the same conductive opaque coating 920, having a continuous geometry and including coding pattern 910. As discussed above, charge is distributed throughout the continuous geometry. If distributing the charge is insufficient, FIG. 9 includes mounting holes 930 that are punched through the encoder strip. Opaque coating 920 extends up to mounting holes 930, providing a ground path area around the holes. By mounting the encoder to at least one conductive mount, such as support mounts 310 in FIG. 3, the encoder can be discharged. Similarly, in FIG. 10, contact path 1010 goes through opaque coating 920. By using a conductive contact along contact path 1010, such as a guide, the encoder can be discharged.

As discussed above, using various embodiments of the present invention, no additional parts or cost are needed in most situations to reduce charge build-up, and hence reduce particulate matter accumulation, in optical encoders. Those skilled in the art will appreciate that embodiments of the present invention can be used with encoders having a wide variety of form factors in addition to round and rectangular films. Those skilled in the art will also appreciate that embodiments of the present invention can be used with a wide variety of conductive geometries and encoding patterns. For instance, in certain embodiments, rather than using a continuous geometry covering an entire encoder surface, multiple continuous geometries could be used on an encoder surface, covering different parts of the surface, but still providing areas for charge distribution and/or dissipation. Alternatively, in some embodiments of the present invention, some sections of the encoder surface may remain isolated, with other sections of the encoder surface being covered with one or more continuous, conductive geometries. For instance, charge accumulation may be irrelevant in areas of an encoder surface that are not covered by an encoder pattern. So, leaving those sections isolated may have no performance impact on the encoder. Even in areas covered by an encoder pattern, some embodiments may be designed to include some isolated pattern features, or some pattern features may become isolated during the operational life of an encoder if, for instance, the conductive coating is scratched. The extent to which charge accumulation is reduced tends to depend on the size, location, and/or number of isolated sections relative to the continuous, conductive section(s). In other words, performance benefits of embodiments of the present invention tend to increase with fewer and/or smaller isolated pattern features, as well as with isolated pattern features placed closer to a continuous, conductive geometry.

Thus, a modified optical pattern for an optical encoder is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An optical encoder comprising:
   a planer surface comprising an insulator material; and
   an optical encoder pattern partially occupying the planer surface, said encoder pattern comprising at least one continuous geometry, and said continuous geometry comprising a conductive material, wherein the conductive material distributes an electrical charge across the continuous geometry without a ground.

2. The optical encoder of claim 1 wherein the planer surface comprises a thin film, at least a portion of said thin film being optically transmissive.

3. The optical encoder of claim 1 wherein the encoder pattern comprises at least one of an opaque coating and a series of regularly spaced features situated along an edge of the planer surface.

4. The optical encoder of claim 3 wherein the series of regularly spaced features comprises rectangular opening in the opaque coating, each rectangular opening having long side situated perpendicular to the edge of the planar surface, and each rectangular opening having a short side substantially equal in length to a segment of the opaque coating that separates a next rectangular opening in the regular pattern.

5. The optical encoder of claim 1 further comprising:
   a mounting hole at a center of the planar surface.

6. The optical encoder of claim 1 further comprising:
   a mounting area at an end of the planar surface.

7. The optical encoder of claim 1 further comprising:
   a contact path parallel to an edge of the planar surface.

8. The optical encoder of claim 1 wherein the continuous geometry includes a distribution field surrounding the optical encoder pattern.

9. The optical encoder of claim 1 wherein the optical encoder pattern comprises at least one isolated feature.

10. The optical encoder of claim 1 wherein the at least one continuous geometry entirely encompasses the optical encoder pattern.

11. An optical encoder comprising:
    an optically transmissive substrate to moveably couple with an optical sensor; and
    an opaque coding pattern partially covering the substrate to stimulate the optical sensor responsive to a motion between the substrate and the sensor, said coding pattern comprising a conductive material and at least one continuous geometry to at least partially distribute electrical charge over the opaque coding pattern without a ground.

12. The optical encoder of claim 11 wherein the motion comprises one of a rotational motion of the substrate relative to the sensor and a lateral motion of the sensor relative to the substrate.

13. The optical encoder of claim 11 further comprising:
    a mounting hole at a center of the substrate to couple with an axle so as to rotate in unison with the axle.

14. The optical encoder of claim 11 further comprising:
a mounting area at an end of the substrate to couple the substrate to a support structure in parallel to a lateral motion of a carriage to which the optical sensor is mounted.

15. The optical encoder of claim 11 further comprising:
a contact path along an edge of the substrate to frictionally couple the substrate to a conductor during the motion.

16. The optical encoder of claim 11 wherein the continuous geometry of the coding pattern comprises a distribution field surrounding a regular pattern of openings, wherein friction over the regular pattern of openings generates the electrical charge, said distribution field to absorb the electrical charge from the regular pattern of openings.

17. An imaging system comprising:
an optical encoder having an optical encoding pattern; and
an optical sensor optically coupled to the optical encoder, at least one of the optical encoder and the optical sensor to move in proportion to an imaging media in the imaging system, said optical sensor to sense movement of the imaging media based on a relative motion between the optical encoder and the optical sensor, said optical encoder pattern comprising a conductive material and having at least one continuous geometry to at least partially distribute electrical charge over the encoder pattern without a ground.

18. The imaging system of claim 17 further comprising:
a feed roller to transport the imaging media, said optical encoder being coupled to an end of the feel roller to rotate in unison with the feed roller, said optical sensor being fixed relative to a rotational motion of the feed roller.

19. The imaging system of claim 17 further comprising:
a lateral carriage to transport an imaging element relative to the imaging media, said optical sensor being coupled to said lateral carriage to move in unison with the lateral carriage, said optical encoder being fixed relative to a lateral motion of the lateral carriage.

20. A method comprising:
developing an electrical charge along a friction path on an optical encoder, said friction path traversing an encoder pattern, said encoder pattern comprising a portion of at least one continuous geometry of conductive material partially covering a surface area of the optical encoder; and at least partially distributing the electrical charge from the encoder pattern through the continuous geometry without a ground.

21. The method of claim 20 wherein developing the electrical charge comprises:
rotating the optical encoder through an optical sensor, said friction path comprising a contact path between the optical sensor and the optical encoder.

22. The method of claim 20 wherein developing the electrical charge comprises:
sliding an optical sensor over the optical encoder, said friction path comprising a contact path between the optical sensor and the optical encoder.

23. A method for reducing particulate deposition on an optical encoder, the method comprising:
forming an encoder pattern having at least one continuous geometry on the optical encoder using a conductive coating without a ground; and,
providing a distribution field for distributing electrical charge in the continuous geometry adjacent to the encoder pattern.

24. An apparatus comprising:
means for encoding motion for an optical sensor;
means for developing an electrical charge along a friction path on the means for encoding; and
means for distributing to at least partially distribute the electrical charge without a ground, said means for distributing comprising at least one continuous geometry of conductive material partially covering a surface area of the means for encoding.

25. The apparatus of claim 24 wherein the means for developing the electrical charge comprises:
means for rotating the means for encoding through the optical sensor, said friction path comprising a contact path between the optical sensor and the means for encoding.

26. The apparatus of claim 24 wherein the means for developing the electrical charge comprises:
means for sliding the optical sensor over the means for encoding, said friction path comprising a contact path between the optical sensor and the means for encoding.

* * * * *